United States Patent [19]
Woo

[11] Patent Number: 5,485,219
[45] Date of Patent: Jan. 16, 1996

[54] ELECTRIC SERVICE TO RECORD TRANSMISSIONS WITHOUT RECORDING COMMERCIALS

[75] Inventor: Thomas Woo, Hong Kong, Hong Kong

[73] Assignee: Depromax Limited, Kowloon, Hong Kong

[21] Appl. No.: 229,296

[22] Filed: Apr. 18, 1994

[51] Int. Cl.$^6$ .............................. H04N 5/14; H04N 9/64
[52] U.S. Cl. .................... 348/460; 348/722; 348/907; 348/8; 358/908
[58] Field of Search .................... 348/722, 907, 348/571, 8, 5, 1, 460, 552, 906; 358/908; H04N 5/14, 9/64

[56] References Cited

U.S. PATENT DOCUMENTS

| | | |
|---|---|---|
| 3,696,297 | 10/1972 | Otero ......................................... 325/55 |
| 4,520,404 | 5/1985 | Von Kohorn ............................. 358/335 |
| 4,706,121 | 11/1987 | Young ........................................ 358/142 |
| 4,725,886 | 2/1988 | Galumbeck et al. . |
| 4,750,052 | 6/1988 | Poppy et al. . |
| 4,750,213 | 6/1988 | Novak . |
| 4,774,600 | 9/1988 | Baumeister . |
| 4,912,552 | 3/1990 | Allison, III et al. . |
| 4,918,531 | 4/1990 | Johnson . |
| 4,963,995 | 10/1990 | Lang . |
| 4,977,455 | 12/1990 | Young . |
| 5,151,788 | 9/1992 | Blum . |
| 5,343,251 | 8/1994 | Nafeh ....................................... 348/571 |

*Primary Examiner*—Victor R. Kostak
*Assistant Examiner*—Nina M. West
*Attorney, Agent, or Firm*—Townsend and Townsend and Crew

[57] ABSTRACT

A central station monitors television broadcasts and issues control and informational broadcasts to receivers located in the homes of users. The information broadcasts include a TV program schedule table and recorder control data. In response to the control broadcasts, processors receiving the broadcast will pause and resume recording of the identified broadcasts. A user can phone into the central station to have the user's recorder programmed to record a particular broadcast.

17 Claims, 4 Drawing Sheets

ELECTRIC SERVICE TO RECORD TRANSMISSIONS WITHOUT RECORDING COMMERCIALS

BACKGROUND OF THE INVENTION

The present invention relates generally to a method and apparatus for controlling a recording device receiving commercial broadcasts. More specifically, the present invention relates to a method and apparatus for eliminating commercials from recorded television broadcasts.

A recurring theme among those who use a video cassette recorder (VCR) for recording typical television broadcasts is that recordings of desired broadcasts are interspersed with undesirable commercials or advertisements. Depending upon the timeliness of the commercials or the delay between the recording of the programming material and its subsequent viewing by the user, some or all of the commercial material may be outdated and inappropriate for viewing. Additionally, recording commercials interspersed within a television broadcast requires more recording tape than would be required without recording the unwanted material.

The prior art provides a number of solutions to users trying to overcome the problem of recording a television broadcast without recording the interspersed commercial segments. Some solutions in the prior art are geared to individual users by incorporating automatic commercial detection features directly into a VCR. The automatic detection features are not always accurate and can result in improperly identifying a commercial as program material and the program as a commercial, resulting in misrecording the program and only recording unwanted commercials. Additionally, some of the solutions are not available to owners of VCRs that do not have the features built-in.

SUMMARY OF THE INVENTION

The present invention provides apparatus and method for simply, efficiently and economically removing unwanted programming content (commercials) from recordings of television broadcasts.

The preferred embodiment allows a user to select desired television broadcasts for recording from a menu, and to select whether to record the program commercial-free. The feature is available by use of a device separate from a the VCR, though in some embodiments it may be incorporated into a VCR. The features of the preferred embodiment are available to users who do not program VCRs, and to users of most VCRs presently available as an after-market product.

According to one aspect of the invention, it includes a control station having number of controllers associated with each channel of a broadcast area. The controllers include ON and OFF switches that are actuated according to programming content of a particular channel. Each controller connects to a transmitter, as does a TV scheduler. The transmitter broadcasts various control information, including TV program schedule tables and ON and OFF commands associated with particular channels. Processors receive the broadcasts and use program recording control event information entered by a user in conjunction with the broadcast ON and OFF command to control a VCR recording the identified channel in a commercial-free mode.

In operation, the broadcast recording control system preferably uses human operators to monitor live broadcasts of particular channels. The operators actuate their OFF switches when programming is presented on the television that is not to be recorded. Similarly, the operators actuate their ON switches when programming to be recorded is broadcast. The transmitter associates the operator's channel with the OFF or ON command and transmits the commands. Processors set to record the particular channel associated with the broadcast OFF or ON command respond to the command to control the associated VCR appropriately.

The control station also periodically transmits a TV program schedule table that is stored in the processor. Users can access the table and cycle through entries of the schedule table to find desired programming. Programs to be recorded are identified by name, and the processor will start and stop the VCR at the appropriate time, and eliminate commercials during the broadcast, if desired by the user. Each processor is individually addressable, and can be remotely activated, deactivated or programmed. The latter feature allows a user that has not preselected a particular channel for recording to contact the control station and have the control station enter appropriate data into the user's processor in order to record the desired program.

By use of the present invention, a user can simply select desired programming for recording and identify the recording to be recorded without commercials. The user does not have to have a special recorder or know how to program a device. The device is able to react appropriately to extended programming interruptions and other types of undesired programming that should not be recorded, allowing a user to avoid obsolete commercial information or to use minimal amounts of recording tape.

Reference to the remaining portions of the specification, including the drawing and claims will realize other features and advantages of the present invention.

DESCRIPTION OF THE PREFERRED EMBODIMENT

Figure 1:
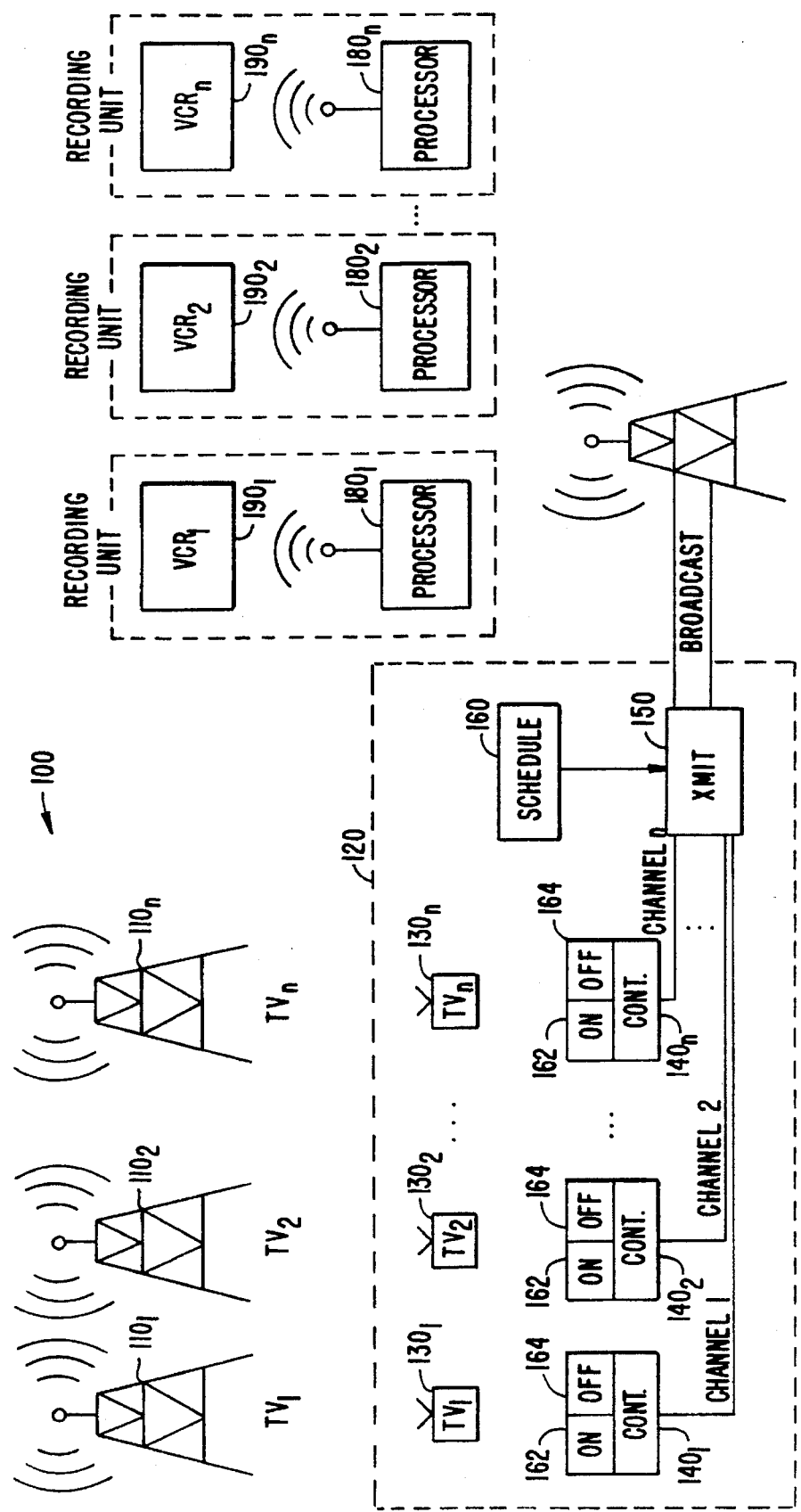
FIG. 1 is a generalized block diagram illustrating a preferred embodiment of a broadcast recording control system.

FIG. 1 is a generalized block diagram illustrating a preferred embodiment of a broadcast recording control system 100. As is well known, there are a plurality of television transmitters $110_i$, i=1 to n, for transmitting different television broadcasts on different channels. A control station 120 includes a plurality of television monitors $130_j$, j= 1 to n, a plurality of controllers $140_k$, k= 1 to n, a transmitter 150, and a scheduler 160.

There is a controller $140_k$ for each monitored broadcast, and therefore, control station 120 associates one controller $140_k$ with each television monitor $130_j$. Further, each controller $140_k$ of the preferred embodiment includes two switches, an ON switch 162 and an OFF switch 164.

From time to time, transmitter 150 broadcasts a control packet. Transmitter 150 receives an actuation signal from each controller 140$_k$ whenever ON switch 162 or OFF switch 164 is actuated. Transmitter 150 encapsulates each switch actuation signal along with a channel identifier to generate one type of control packet. Any control packet that includes a switch actuation signal is broadcast immediately.

Scheduler 160 develops a TV program schedule table of future television broadcasts for the monitored television broadcasts. The schedule table identifies television broadcasts by name, the program's channel (and duration), and the day of the week. The schedule table may include future programming scheduled for broadcast, with entries spanning several days, weeks or months, depending upon particular implementations. In the preferred embodiment, scheduler 160 includes a keyboard for data entry by a human operator. The TV schedule table of the preferred embodiment includes one week's of television programming broadcast data and is updated daily in processors 180.

In the preferred embodiment, transmitter 150 uses a paging network, RF transmission, cable, or other medium. While preferably transmitter 150 broadcasts control and programming information, in some applications, a direct communication medium between transmitter 150 and each processor 180 may be implemented, such as for example, use of a telephone line. It is believed that the broadcasting of the information provides the easiest and most user-transparent system.

Broadcast recording control system 100 includes a plurality of processors 180$_l$, l= 1 to m, each associated with one of a plurality of video cassette recorders (VCRs) 190$_l$. In the preferred embodiment, m is much greater than n, but it is anticipated that at any given time, for each channel there will be at least one VCR 190$_l$ recording that particular channel. VCRs 190$_l$ are capable of receiving selected television broadcasts from various ones of television transmitters 110$_n$ and recording those broadcasts on a video tape, as well known. In the preferred embodiment, each VCR 190$_l$ responds to infrared electromagnetic signals to select a particular channel, and to control recording (i.e., ON, RECORD START, PAUSE, STOP, OFF, for example).

As described in more detail below, each processor 180$_l$ is able, in the preferred embodiment, to transmit a PAUSE command and a RECORD command to its associated VCR 190$_l$. For some VCRs 190$_l$, the PAUSE command is implemented as a STOP command. Therefore, a PAUSE command in the context of the present invention includes any command that suspends a recording function and will later allow recording to be resumed. Each processor 180$_l$ also includes a unique identifier allowing control station 120 to selectively activate and deactivate particular ones of the processors 180$_l$. Some broadcasts from control station 120 that are appropriately identified are recognized by all processors 180$_l$, causing all processors to respond, such as for example, broadcasts initiated from scheduler 160 to update programming information in all processors 180$_l$. Details regarding identifying broadcasts and use of the unique identifiers will be discussed below.

In operation, the preferred embodiment provides at least one television monitor 130 for each television broadcast 110. A human operator, one for each television monitor 130, watches each channel for commercials or other broadcast material that is not to be recorded. When a commercial segment is shown on television monitor 130, the operator actuates OFF switch 164, causing transmitter 150 to broadcast an OFF command associated with the operator's channel.

Those particular processors 180$_l$ that are set to record broadcasts associated with the operator's channel, and that are set to record in a commercial-free mode, respond to the broadcast OFF command. These particular processors 180$_l$ transmit the PAUSE command to their associated VCRs 190$_l$, causing the VCR 190$_l$ to stop recording. As a result, the commercial segment is not recorded.

At some time later, the operator watching the particular channel will note a resumption of desired programming by observing a program segment on television monitor 130. When observing the program segment to be recorded, the operator actuates ON switch 162, causing transmitter 150 to broadcast an ON command, again associated with the operator's channel.

Those particular processors 180$_l$ that had paused recording of their associated VCRs 190$_l$ that were set to the operator's channel, again respond to the broadcast ON command. These processors 180$_l$ transmit the RECORD command (or un-PAUSE) to their associated VCR's 190$_l$, resuming recordation of the desired program segment. In the preferred embodiment, the operators continue to monitor their televisions, actuating their ON and OFF switches, as appropriate. The processors react only during those times and to broadcasts identified by the appropriate channel designation, that they have been programmed to respond to in order to record desired broadcasts, commercial-free.

Figure 2:
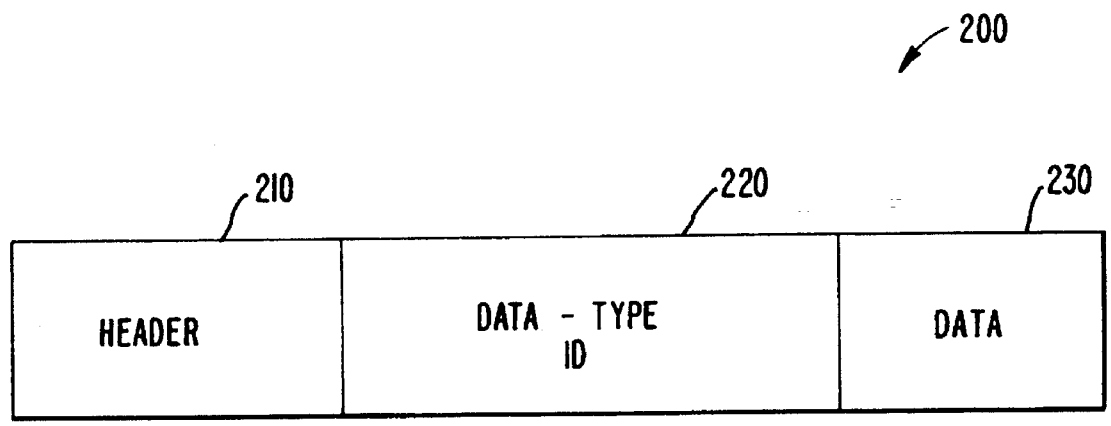
FIG. 2 is a diagrammatic representation of a packet 200 for transmissions from transmitter 150.

FIG. 2 is a diagrammatic representation of a packet 200 for transmissions from transmitter 150. Packet 200 includes a header 210, a data-type ID 220, and a data portion 230. Header 210 identifies packet 200 to processor 180 as information relating to broadcast control recording system 100. Transmissions with an improper header are not processed by processor 180.

Data-type ID 220 includes a digital word that identifies the type of data in data portion 230. There are three different digital words used in the preferred embodiment: a table word, a channel word, and an identifier word. When data-type ID 220 includes the table word, processor 180 uses data present in data portion 230 to construct a TV program schedule table. When data-type ID 220 includes the channel word, processor 180 uses data in data portion 230 to control recording of its associated VCR 190. When data-type ID 220 includes the identifier word, processor 180 treats data in data portion 230 as specialized individual control information directed specifically to that one processor 180$_l$ that has its unique identifier matching the identifier word. In some embodiments, the processors 1801 may have a portion of the identifier identifying a particular broadcast group, and the identifier in data-type ID 220 could use the group identifier to control a particular group of processors 180$_l$ matching the group ID.

For table data identifiers, data portion 230 represents a plurality of entries for a two-dimensional array having broadcast programming arranged by date and channel so date and channel information can be used as indices into the array. Within each array element, stored will be name and time of all programming scheduled to be broadcast according to the indices, i.e., on the particular date and channel.

For channel data identifiers, data portion 230 includes either an ON code or an OFF code. When processor 180 is in a record mode for the channel identified in data-type ID 220, and the recording mode is commercial-free, processor 180 transmits an appropriate PAUSE command (when its recording) to its associated VCR 190 for every OFF code. Similarly, when paused, processor 180 responds to the ON code to resume recording (when the channel identifier matches the appropriate channel being recorded, and the recording is in commercial-free mode).

For identifier data identifiers, data portion 230 is either a Kill/OK code, or a remote program recording code. When processor 180 determines that its identifier matches the identifier in data-type ID 220, it shuts itself off when data portion 230 matches the Kill code, and it turns itself on when data portion 230 matches the OK code. Off units do not respond to transmissions except an OK code associated with its identifier, therefore a deactivated processor may not be used for recording control or for TV schedule information.

When processor 180 receives a broadcast using its identifier but neither the Kill code or the OK code is in data portion 230, processor 180 uses data portion 230 to alter stored programming. In the preferred embodiment, data portion 230 includes programming data representing a particular date, channel and time when an identifier appears in data-type ID 220, but there is not Kill/OK code. By this expedient, a user of broadcast recording control system 100 is able to phone control station 120 if they remember that a desired program is to be broadcast but the user did not preset processor 180 appropriately. An operator is able to access a database containing appropriate information regarding the user, and program the user's processor 180 to record the desired program via a special broadcast to the user's processor 180.

Figure 3:
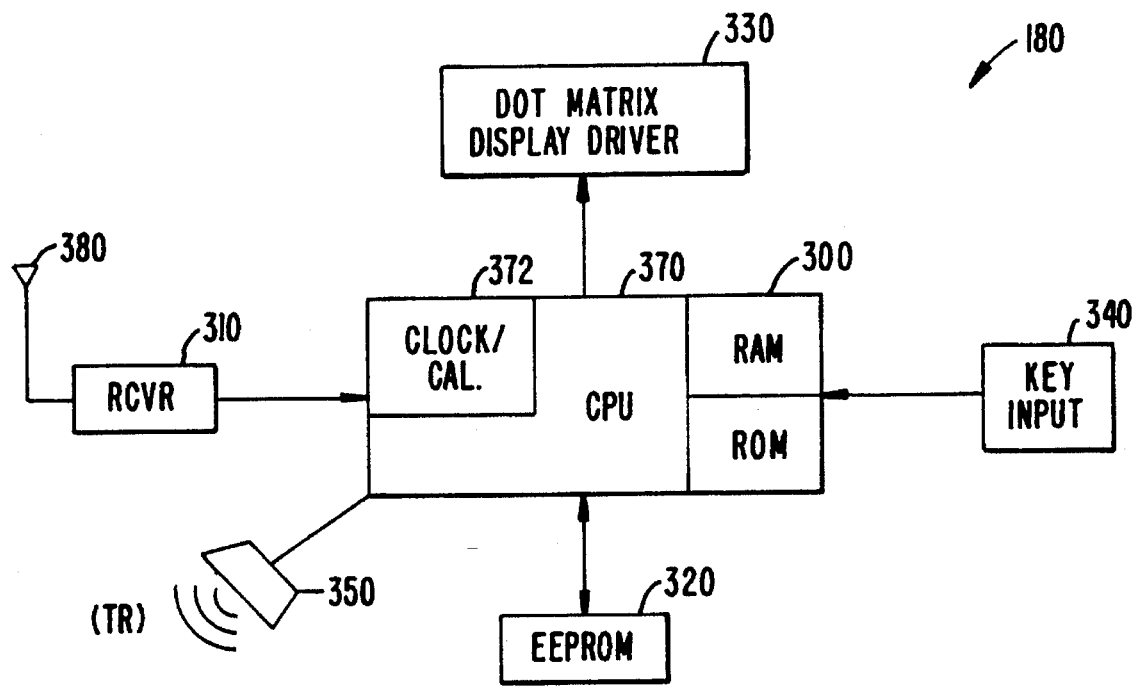
FIG. 3 is a block diagram of a processor according to a preferred embodiment of the present invention.

FIG. 3 is a block diagram of processor 180 according to a preferred embodiment of the present invention. Processor 180 includes a computer 300, a receiver 310, an electrically-erasable, programmable, read-only memory (EEPROM) 320, a display driver 330, key input 340, and an infrared (IR) transmitter 350. Computer 300 includes a central processing unit (CPU) 370, a battery-powered internal clock/calendar circuit 372, read/write memory (RAM) 374, and read-only memory (ROM) 376. FIG. 3 represents but one type of processor suitable for embodying the present invention. Other types of systems could be used.

Figure 5:
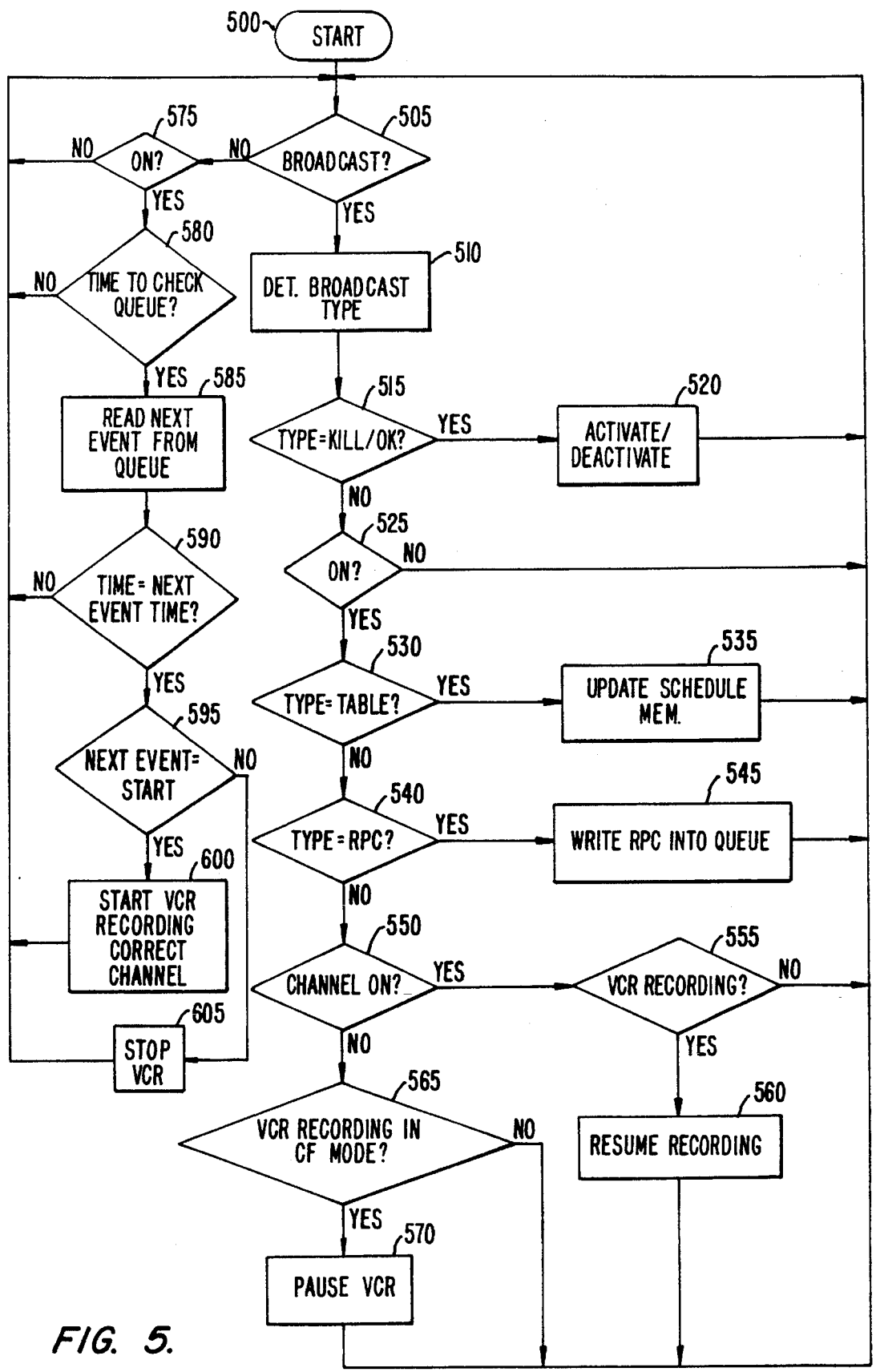
FIG. 5 is a flowchart illustrating operation of the processor to control a VCR according to a preferred embodiment of the present invention.

A preferred embodiment uses an appropriately programmed CPU 370, such as for example an 86800 series 8-bit, made and distributed by Sanyo Semiconductor Corporation. It is to be understood that other CPUs are available and may implement the invention in other forms. The flowchart of FIG. 5 is implemented by CPU 370 under appropriate process control and instruction from procedures stored in RAM 374, ROM 376 and EEPROM 320 and provided as part of broadcast recording control system 100.

Receiver 310 receives packet broadcasts from transmitter 150 via antenna 380. All broadcasts from transmitter 150 are converted in a format usable by computer 300. After receipt and conversion, CPU 370 writes all digital data in packet 200 into RAM 374 for processing. If CPU 370 does not detect a proper header 210, it ignores the broadcast. When the TV program schedule table is broadcast and stored in RAM 374, CPU 370 passes the indices for each table entry through a particular formula in order to calculate a particular memory location address to store that entry. CPU 370 stores the table at appropriate locations in EEPROM 320.

The organization of the TV program schedule table in RAM 374 in the preferred embodiment is as follows. Each single record in the TV program schedule table includes program name, start time and stop time and takes up "m" bytes. For the following equations, take "n" as the maximum number of programs scheduled to be broadcast for a channel on any single day, and "p" as the number of available channels. In the TV program schedule table of the preferred embodiment storing program information for one week, seven days of program information are stored for the first channel, followed by seven days of program schedule data for the next channel, and continuing for all the channels. Thus, the size of the TV program schedule table is 7*m*n*p bytes.

An address counter of processor 180 is initially set at the starting address of the TV program schedule table. As a user cycles through entries, m is added or subtracted from the present address to obtain the desired address. To go to the next day from the present address, m*n is added to the counter, and to go to the next channel, 7*m*n is added.

The date code, after passing through the formula, has a value ranging from 1 to 7, corresponding to one week's schedule information. Any new data overwrites old data. An advantage of the preferred storage method is that it permits CPU 370 to retrieve up-to-date data by direct memory access. For example, when CPU 370 desires to access the TV program schedule table for date x on channel y, CPU 370 passes x and y through the formula to access the appropriate memory address as described above. CPU 370 is thereafter able to load from the calculated address an entire chunk of data into RAM 374 for processing.

When CPU 370 detects that the stored broadcast data is a commercial recording control code, CPU 370 determines whether it is presently controlling recording by VCR 190, whether the recording is in commercial-free mode, and whether the channel id matches the channel the VCR 190 is recording. When all three are true, CPU 370 directs IR transmitter 350 to issue the PAUSE command in response to an OFF code, and to issue a RECORD command in response to an ON code.

When CPU 370 detects that the stored broadcast data includes an identifier matching its unique identifier stored in EEPROM 220, it reads the data portion of the broadcast packet as described above. For Kill codes, CPU 370 writes a code into EEPROM 320 to deactivate operation, while for OK codes, CPU 370 writes a code into EEPROM 320 to enable operation. For remote programming codes, CPU 370 writes data for date, channel and time into a program recording control queue where it stores information identifying particular broadcasts a user desires to record, and the mode of the recording (e.g., commercial-free, normal, one-time, continuous). In the preferred embodiment, a received remote programming code overwrites any conflicting data stored in the program recording control queue.

For user control of programming information and other options, CPU 370 responds to signals from key input 240 and presents currently selected options on a dot matrix display controlled by dot matrix display driver 230.

Figure 4:
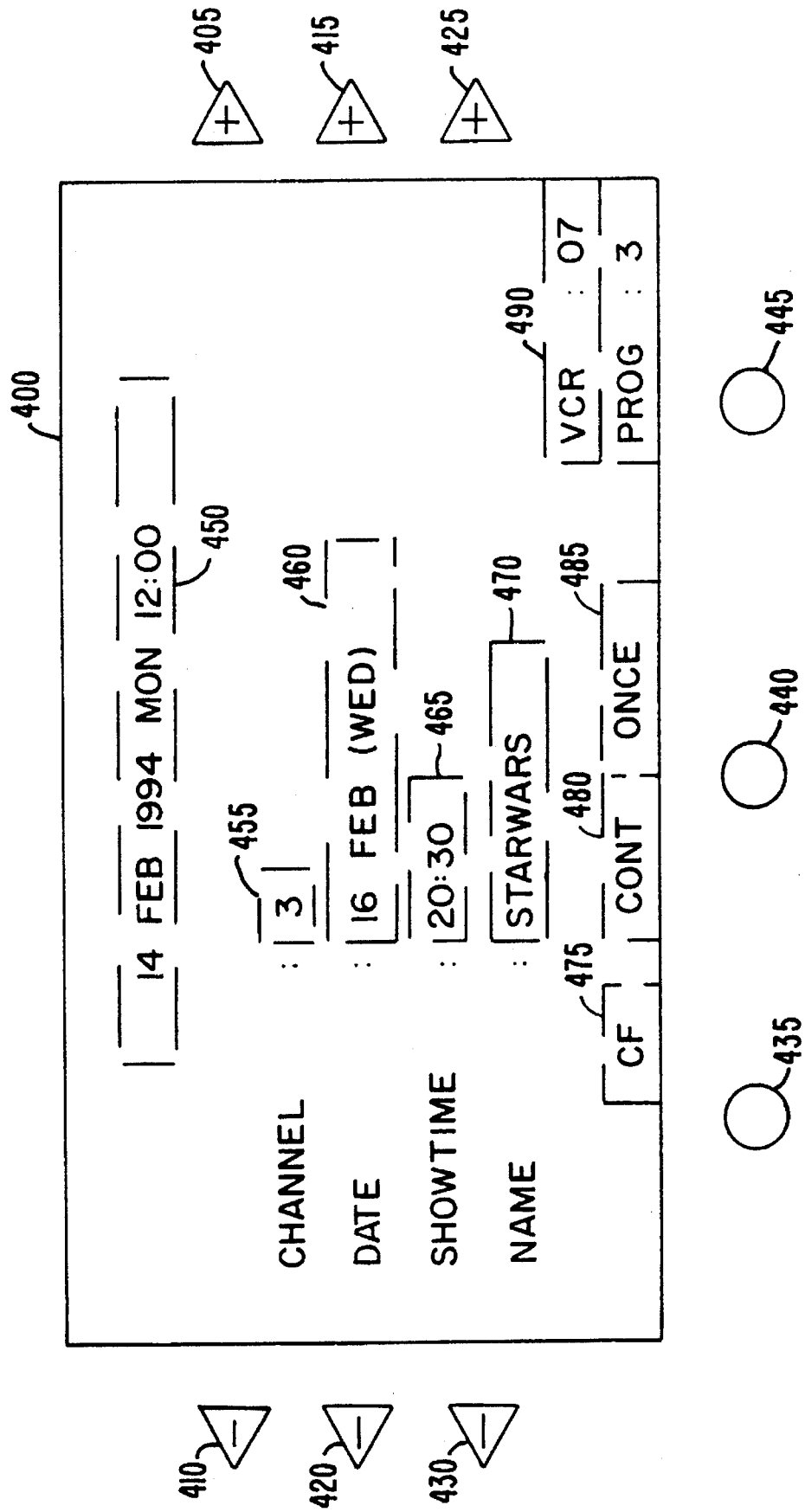
FIG. 4 is a view of a display of the processor.

FIG. 4 is a view of a display 400 of processor 180 according to a preferred embodiment of the present invention. Positioned along edges of display 400 are operator buttons for controlling features of processor 180. There are pairs of buttons to cycle through different entries in the TV program schedule table, a portion of which is shown at any time. Buttons include a channel up button 405 and a channel down button 410, a date up button 415 and a date down button 420, a showtime up button 425 and a showtime down button 430, as well as a commercial-free button 435, a continuous recording button 440, and a program button 445.

To assist the user, display 400 includes a date/time field 450 to display the present date and time. Display 400 includes a number of fields for accessing the TV program schedule table, including a channel field 455, a date field 460 and a showtime field 465. As described above, CPU 370 of FIG. 3 stores the TV program schedule table and accesses the table through use of channel and date indices. When a user enters a desired channel and date into CPU 370 (by up/down buttons 405, 410, 415 and 420 and as indicated by channel display field 455 and date field 460) a particular segment of the table is loaded in the processor's memory as described above. As a user cycle's through the showtimes, using the up button 425 and the down button 430, display 400 presents the selected showtime at showtime field 465 and presents the program's name using a showname field 470.

The user selects whether to record the program in commercial-free mode (by depressing commercial-free button 435) and whether the program is to be recorded just once or continuously (repeated operation of continuous recording button 440 toggles between continuous recording and single show recording). Status of the user's selections for commercial-free mode is presented on display 400 by illuminating a symbol in a commercial-free field 475 when processor 180 is set to record in commercial-free mode. Additionally, display driver 330 in FIG. 3 illuminates a continuous recording field 480 when the status of continuous recording button 440 indicates continuous mode, otherwise display driver 330 illuminates a single recording field 485.

Continuous recording mode allows a user to identify particular programs for periodic recording without having to identify and mark each program's occurrence manually. For example, if on a Wednesday, a user marks a particular program as continuous recording, processor 180 will review the TV program schedule table from the present date and time forward to find and mark the same program for recording. Processor 180 searches and marks each occurrence (and adds the program to the program recording control queue located in RAM). Processor 180 will continue to add programs until the program recording control queue is full or the total recording time exceeds the maximum time of the recording tape (as predetermined by the user or set by VCR type, for example). Exceeding the maximum recording time causes processor 180 to prevent the user from adding any new programs to the program recording queue until the users resets the system, indicating a new tape has been added. The user is warned whenever the total recording time exceeds the predetermined recording time.

A VCR type field 490 displays the value selected by the user that represents the type of VCR the user sets processor 180 to control. In other words, VCR type field 490 identifies the model of VCR the user has. When the information presented in the display is appropriate, the user operates program button 445 to enter the displayed information into the program recording control queue.

FIG. 5 is a flowchart illustrating operation of the processor to control a VCR according to a preferred embodiment of the present invention. The description of the flowchart of FIG. 5 identifies broadcast recording control system 100 elements using elements set forth in FIG. 3. Processor 180 executes steps 500–605. From step 500, START, processor 180 advances to step 505 to check whether it received a broadcast. When the test at step 505 indicates that processor 180 received a digital word, processor 180 advances to step 510. Step 510 determines a type of the broadcast using the data packet 200 identified in FIG. 2, and as described above. Specifically, after determining the broadcast type, processor 180 advances to step 515 to test whether the data type is the Kill/OK command. If the received broadcast was a Kill/OK code, processor 180 selectively deactivates or activates itself, as appropriate, then returns to step 505.

If the test at step 515 indicates that the type was not a Kill/OK code, processor 180 advances to step 525 to test whether its status is ON or OFF. If processor 180 has been turned OFF, such as by a previous broadcast of a Kill code identifying the specific identifier of the processor 180, then processor 180 immediately returns back to step 505. This feature allows broadcast recording control system 100 operator to selectively deactivate specific processors $180_i$, such if a user has not paid a monthly use fee, for example.

If the device is ON when tested at step 525, processor 180 advances to step 530 to test whether the broadcast includes a TV program schedule table. When the test at step 530 indicates that the data is a TV program broadcast schedule, processor 180 advances to step 535 to update the TV schedule memory. During step 535, the program recording control queue is updated for any programs identified as being in continuous recording. For those programs marked "continuous" recording, when a new TV program schedule table is received, the new schedule is reviewed for these programs and the queue is updated appropriately.

After updating the TV schedule memory at step 535, processor 180 returns to step 505. When the test at step 530 indicates that the data is not a TV program broadcast schedule, processor 180 advances to step 540 to test whether the data includes a remote programming code (RPC).

When the test at step 540 indicates that the data is a remote programming code, processor 180 advances to step 545 to write an appropriate entry into the program recording control queue. Thereafter, processor 180 returns to step 505. When the test at step 540 indicates that the broadcast type is not a remote programming code, processor 180 advances to step 550 to determine if the broadcast is an ON signal for a particular channel.

When processor 180 determines that the broadcast was an ON command, processor 180 advances to step 555 to test whether processor 180 is controlling its associated VCR 190 to record the particular channel in commercial-free mode. If processor 180 is not recording the particular channel, or if the recording is not in commercial-free mode, processor 180 ignores the ON command and returns to step 505. However, when the test at step 550 indicates that processor 180 is recording the particular channel in commercial-free mode, processor 180 advances to step 560. At step 560, processor 180 uses IR transmitter 350 to transmit a RECORD command to its associated VCR 190. Thereafter, processor 180 returns to step 505.

If at step 550 the broadcast is not an ON command for a particular channel, the broadcast must be an OFF command for a particular channel. Therefore, when the test at step 550 is not true, processor 180 advances to step 565. At step 565, processor 180 determines whether it is controlling its associated VCR 190 to record the particular channel in commercial-free mode. When processor 180 is not controlling the recording of the particular channel in commercial-free mode, it returns to step 505 from step 565. However, when processor 180 is controlling the recording of the particular channel, and the recording is in commercial-free mode, processor 180 advances to step 570 from step 565. At step 570, processor 180 uses IR transmitter 350 to transmit a PAUSE command to its associated VCR 190. Thereafter processor 180 returns to step 505 from step 570.

From step 505, periodically processor 180 determines whether it should change the recording mode of its associated VCR 190. In the preferred embodiment, about once every minute, if a broadcast is not received, processor 180 will execute selected ones of steps 575–605. Specifically, from step 505, processor 180 will advance to step 575 to test whether processor 180 is in active mode (whether it is ON).

If not, processor returns to step 505 from step 575. However, when processor 180 is in active mode, processor 180 advances to step 580 to test whether it is time to check the program recording control queue for a recording control event. When processor 180 does not check the program recording control queue for a recording control event, processor 180 returns to step 505.

If, at step 580, it is time to check for a recording control event, processor 180 advances to step 585 to read the next program recording control event from the program recording control queue. Thereafter, processor 180 advances to step 590 to determine whether the present date and time from its internal time/date circuit 372 matches the next program recording control event. If processor 180 determines that there is no match, processor 180 returns to step 505. When the present time matches the next event, processor 180 advances to step 595 from step 590.

At step 595, processor 180 determines whether the next program recording control event is a START event. When the next program recording control event is a START event, processor 180 advances to step 600. At step 600, processor uses IR transmitter 350 to transmit appropriate control codes to its associated VCR 190 to set it to start recording the desired channel. Thereafter, processor 180 returns to step 505 to wait for the ON and OFF commands to selectively remove the unwanted programming segments, such as for example, commercial broadcasts.

However, if at step 595, processor 180 determines that the next program recording control event is not a START event, the event is a STOP event. Processor 180 advances to step 605 in the event of a STOP event to transmit a STOP command to its associated VCR 190. Thereafter, processor 180 returns to step 505.

Prior to first use, a user initializes processor 180. The one-time setup procedure customizes processor 180 to operate with the user's VCR 190. Different sets of universal and model-specific IR control codes are stored in ROM 376. A user selects a desired set of IR control codes for the particular brand and type of VCR 190. Thereafter, processor 180 sets a value within EEPROM 320 to identify the set chosen by the user. Thereafter, even after a power outage, processor 180 is able to control its associated VCR 190. Only the identified set of IR control codes are loaded from ROM and used by processor 180 to transmit appropriate commands to VCR 190 as described above.

In conclusion, the present invention provides a simple, efficient solution to a problem of recording desired broadcast information and ignoring undesired programming. While the above is a complete description of the preferred embodiments of the invention, various alternatives, modifications, and equivalents may be used. For example, individual broadcasts could include encoded messages and digital teletext that could identify the program schedule information and commercial data to produce the "ON" and "OFF" commands. Additionally, a personal computer (PC) interface could be provided to permit the PC to operate as processor 180. Through a modem connection, a user can obtain TV program schedule table and real-time commercial editing data. The interface could include the infrared controller for issuing instructions to the VCR. Still other interfaces could incorporate a receiver, obviating the need for the modem and its connection.

Therefore, the above description should not be taken as limiting the scope of the invention which is defined by the appended claims.

What is claimed is:

1. A method for controlling a recording device receiving a broadcast including a plurality of program segments interspersed with a plurality of commercial segments, the method comprising the steps of:

identifying a first period-type when one of the plurality of program segments is broadcast;

identifying a second period-type when one of the plurality of commercial segments is broadcast;

broadcasting over a transmission medium an ON command when said first period type is identified, wherein said ON command comprises data including a system identifier and a predetermined ON code;

broadcasting over said transmission medium an OFF command when said second period type is identified, wherein said OFF command Comprises data including said system identifier and a predetermined OFF code;

receiving at a controller said ON command and said OFF command broadcast over said transmission medium;

transmitting, from said controller, a RECORD command to the recording device upon receipt of said ON command; and transmitting, from said controller, a PAUSE command to the recording device upon receipt of said OFF command.

2. The controlling method of claim 1 wherein the broadcast is a television broadcast.

3. The controlling method of claim 1 wherein the recording device is a video cassette recorder (VCR).

4. The controlling method of claim 1 wherein said identifying steps are performed by human operators monitoring the broadcast.

5. The controlling method of claim 1 further comprising the steps of:

starting a timer upon transmission of said PAUSE command; and thereafter transmitting said RECORD command after said timer determines a predetermined period has lapsed.

6. A broadcast recording system, comprising:

a television monitor for receiving and displaying a television broadcast including a plurality of program segments interspersed with a plurality of commercial segments;

a first control switch for indicating, upon activation, a first period-type when one of said plurality of program segments are displayed on said television;

a second control switch for indicating, upon activation, a second period-type when one of said plurality of commercial segments are displayed on said television;

a controller, coupled to said first control switch and said second control switch, for generating an ON command when said first control switch is activated and for generating an OFF command when said second control switch is activated, wherein said ON command comprises data including a system identifier and a predetermined ON code, and said OFF command comprises data including said system identifier and a predetermined OFF code;

a transmitter, coupled to said controller, for broadcasting each said ON command and said OFF command;

a receiver for receiving said ON command and said OFF command;

a recording device responsive to a RECORD command to record said television broadcast and responsive to a PAUSE command to suspend recording of said television broadcast, wherein said RECORD command and said PAUSE command are transmittable over infrared frequencies;

an infrared transmitter for transmitting said RECORD command and said PAUSE command to said recording device responsive to a transmit control signal; and a processor, coupled to said receiver and to said infrared transmitter, for asserting said transmit control signal to said infrared transmitter causing said infrared transmitter to transmit said RECORD command when said ON command is received by said receiver, and said processor asserting said transmit control signal to said infrared transmitter causing said infrared transmitter to transmit said PAUSE command when said OFF command is received by said receiver.

7. A television broadcast recording method, comprising the steps of:

receiving and displaying a first television broadcast on a first television monitor wherein said first television broadcast includes a first plurality of program segments interspersed with a first plurality of commercial segments; and concurrently therewith receiving and displaying a second television broadcast different from said first television broadcast on a second television monitor wherein said second television broadcast includes a second plurality of program segments interspersed with a second plurality of commercial segments; thereafter identifying a first period-type for said first television broadcast when one of said first plurality of program segments is broadcast;

identifying said first period-type for said second television broadcast when one of said second plurality of program segments is broadcast;

identifying a second period-type for said first television broadcast when one of said first plurality of commercial segments is broadcast;

identifying said second period-type for said second television broadcast when one of said second plurality of commercial segments is broadcast;

broadcasting, over a transmission medium to a processor, a first ON command when said first period-type for said first television broadcast is identified, wherein said first ON command comprises data including a system identifier, a predetermined ON code, and a first broadcast identifier for indicating that said first ON command is associated with said first television broadcast;

broadcasting, over said transmission medium to said processor, a second ON command when said first period-type for said second television broadcast is identified, wherein said second ON command comprises data including said system identifier, said predetermined ON Code, and a second broadcast identifier for indicating that said second ON command is associated with said second television broadcast;

broadcasting, over said transmission medium to said processor, a first OFF command when said second period-type for said first television broadcast is identified, wherein said first OFF command comprises data including said system identifier, a predetermined OFF code, and said first broadcast identifier;

broadcasting, over said transmission medium to said processor, a second OFF command when said second period-type for said second television broadcast is identified, wherein said second OFF command comprises data including said system identifier, said predetermined OFF code, and said second broadcast identifier;

determining a desired broadcast to be monitored by said processor, with said processor establishing one of said first television broadcast or said second television broadcast as said desired broadcast;

transmitting, from an infrared transmitter coupled to said processor and responsive to a particular one of said first and second ON commands that is associated with said desired broadcast, a RECORD command to a recording device recording said desired broadcast; and transmitting, from said infrared transmitter coupled to said processor and responsive to a particular one of said first and second OFF commands that is associated with said desired broadcast, a PAUSE command to said recording device.

8. The television broadcasting method of claim 7 wherein said broadcasting steps transmit said first and second ON commands and said first and second OFF commands to a second processor concurrently with said broadcast to said first processor, said method further comprising the steps of:

determining a second desired broadcast to be monitored by said second processor, with said second processor establishing one of said first television broadcast or said second television broadcast as said second desired broadcast;

transmitting, from a second infrared transmitter coupled to said second processor and responsive to a particular one of said first and second ON commands that is associated with said second desired broadcast, a RECORD command to a second recording device receiving said second desired broadcast; and transmitting, from said second infrared transmitter coupled to said second processor and responsive to a particular one of said first and second OFF commands that is associated with said second desired broadcast, a PAUSE command to said second recording device.

9. The television broadcasting method of claim 8 wherein said second desired broadcast is different than said desired broadcast.

10. The television broadcast recording method of claim 8 further comprising the steps of:

establishing a television program schedule for both said television broadcasts;

transmitting said television program schedule to both said processor and to said second processor; and using said television program schedule to determine said desired broadcast and said second desired broadcast.

11. The television broadcast recording method of claim 8 further comprising the step of:

storing said television program schedule in each said processor.

12. The television broadcast recording method of claim 8 further comprising:

selecting a series of desired broadcasts for each processor using said television program schedule; and entering said series of desired broadcasts into a program control queue, established in each processor and used to control said processor.

13. The television broadcast recording method of claim 12 wherein said broadcasting steps are broadcast from a central office, and further comprising the steps of:

transmitting a remote programming code to one of said processor and said second processor identifying a particular television broadcast from said central office; and entering said remote programming code into said program control queue of said one processor to have said particular one processor control recording of said particular television broadcast.

14. The television broadcast recording method of claim 13 wherein said one processor includes a predetermined identifier and wherein said entering step only enters said remote programming code into said one processor when a transmitted identifier associated with said remote programming code matches said predetermined identifier.

15. A method for controlling a recording device receiving a broadcast including a plurality of program segments interspersed with a plurality of commercial segments, the method comprising the steps of:

identifying a first period-type when one of the plurality of program segments is broadcast;

identifying a second period-type when one of the plurality of commercial segments is broadcast;

broadcasting over a transmission medium a first control packet when said first period type is identified, said first control packet comprising a system identifier and a predetermined ON code;

broadcasting over said transmission medium a second control packet when said second period type is identified, said second control packet comprising said system identifier and a predetermined OFF code;

receiving, at a controller, said first control packet broadcast over said transmission medium;

receiving, at said controller, said second control packet broadcast over said transmission medium;

transmitting, from said controller, a RECORD command to the recording device responsive to said first control packet; and transmitting, from said controller, a PAUSE command to the recording device upon receipt of said second control packet.

16. A broadcast recording system, comprising:

a television monitor for receiving and displaying a television broadcast including a plurality of program segments interspersed with a plurality of commercial segments;

a first control switch for indicating, upon activation, a first period-type when one of said plurality of program segments are displayed on said television;

a second control switch for indicating, upon activation, a second period-type when one of said plurality of commercial segments are displayed on said television;

a controller, coupled to said first control switch and said second control switch, for generating a first control packet when said first control switch is activated and for generating a second control packet when said second control switch is activated, wherein said first control packet comprises a system identifier and a predetermined ON code, and said second control packet comprises said system identifier and a predetermined OFF code;

a transmitter, coupled to said controller, for broadcasting each said first control packet and said second control packet;

a receiver for receiving said first control packet and said second control packet;

a video recording device responsive to a RECORD command to record said television broadcast and responsive to a PAUSE command to suspend recording of said television broadcast, wherein said RECORD command and said PAUSE command are transmittable over infrared frequencies;

an infrared transmitter for transmitting said RECORD command and said PAUSE command to said video recording device responsive to a transmit control signal;

a processor, coupled to said receiver and to said infrared transmitter, for asserting said transmit control signal to said infrared transmitter causing said infrared transmitter to transmit said RECORD command when said first control packet is received by said receiver, and said processor asserting said transmit control signal to said infrared transmitter causing said infrared transmitter to transmit said PAUSE command when said second control packet is received by said receiver.

17. A television broadcast recording method, comprising the steps of:

receiving and displaying a first television broadcast on a first television monitor wherein said first television broadcast includes a first plurality of program segments interspersed with a first plurality of commercial segments; and concurrently therewith receiving and displaying a second television broadcast different from said first television broadcast on a second television monitor wherein said second television broadcast includes a second plurality of program segments interspersed with a second plurality of commercial segments;

identifying a first period-type for said first television broadcast when one of said first plurality of program segments is broadcast;

identifying said first period-type for said second television broadcast when one of said second plurality of program segments is broadcast;

identifying a second period-type for said first television broadcast when one of said first plurality of commercial segments is broadcast;

identifying said second period-type for said second television broadcast when one of said second plurality of commercial segments is broadcast;

broadcasting, over a transmission medium to a processor, a first control packet when said first period-type for said first television broadcast is identified, said first control packet comprising a system identifier, a predetermined ON code, and a first broadcast identifier indicating that said first control packet is associated with said first television broadcast;

broadcasting, over said transmission medium to said processor, a second control packet when said first period-type for said second television broadcast is identified, said second control packet comprising said system identifier, said predetermined ON code, and a second broadcast identifier indicating that said second control packet is associated with said second television broadcast;

broadcasting, over said transmission medium to said processor, a third control packet when said second period-type for said first television broadcast is identified, said third control packet comprising said system identifier, a predetermined OFF code, and said first broadcast identifier;

broadcasting, over said transmission medium to said processor, a fourth control packet when said second period-type for said second television broadcast is identified, said fourth control packet comprising said system identifier, said predetermined OFF code, and said second broadcast identifier;

determining a desired broadcast to be monitored by said processor by selecting, at said processor, one of said first or second television broadcast as said desired broadcast;

transmitting, from an infrared transmitter coupled to said processor and responsive to said first or second control packets associated with said desired broadcast, a RECORD command to a recording device recording said desired broadcast; and transmitting, from said infrared transmitter coupled to said processor and responsive to a particular one of said third and fourth control packets associated with said desired broadcast, a PAUSE command to said recording device.

* * * * *